United States Patent [19]
Olofsson et al.

[11] Patent Number: 6,157,627
[45] Date of Patent: Dec. 5, 2000

[54] CHANNEL ALLOCATION FOR MIXED MULTISLOT SERVICES

[75] Inventors: Håkan Gunnar Olofsson; Magnus Lorentz Hartman, both of Stockholm, Sweden

[73] Assignee: Telefonaktiebolaget LM Ericsson, Stockholm, Sweden

[21] Appl. No.: 08/880,743

[22] Filed: Jun. 23, 1997

[51] Int. Cl.[7] .................................................. H04Q 7/00
[52] U.S. Cl. ............................................................ 370/329
[58] Field of Search ................................... 370/329, 330, 370/331, 332, 335, 337, 342, 344, 347, 478, 451, 252, 341, 431; 455/450, 451, 452, 509, 512, 436–439, 513

[56] References Cited

U.S. PATENT DOCUMENTS

| | | | |
|---|---|---|---|
| 2,941,038 | 6/1960 | Hideo Seki ................................ | 179/15 |
| 4,785,450 | 11/1988 | Bolgiano et al. ......................... | 370/95 |
| 4,868,811 | 9/1989 | Suzuki ..................................... | 370/436 |
| 5,280,630 | 1/1994 | Wang ....................................... | 370/452 |
| 5,390,181 | 2/1995 | Campbell et al. ....................... | 370/85.2 |
| 5,542,093 | 7/1996 | Bodin et al. ............................. | 455/33.2 |
| 5,752,193 | 5/1998 | Scholefield et al. .................... | 370/452 |
| 5,852,780 | 12/1998 | Wang et al. ............................. | 370/450 |

FOREIGN PATENT DOCUMENTS

WO94/05130  3/1994  WIPO .............................. H04Q 7/04

OTHER PUBLICATIONS

Ivanovich, M. et al., "Channel Allocation Methods for Half and Full Rate Connections in GSM", 1996 IEEE International Conference on Communications (ICC), Converging Technologies for Tomorrow's Applications, Dallas, Jun. 23–27, 1996, vol. 3 of 3, pp. 1756–7160.

Iera, A. et al., "Transport and Control Issues in Multimedia Wireless Networks" Wireless Networks, vol. 2, No. 3, Aug. 1996, pp. 249–261.

Rappaport, S. et al., "Prioritized Resource Assignment for Mobile Cellular Communication System with Mixed Services and Platform Types", IEEE Transactions on Vehicular Technology, vol. 45, No. 3, Aug. 1996, pp. 443–458.

*Primary Examiner*—Ajit Patel
*Assistant Examiner*—Hanh Nguyen
*Attorney, Agent, or Firm*—Burns, Doane, Swecker & Mathis, L.L.P.

[57] ABSTRACT

A method and system for allocating and reallocating communication channel resources in a resource area defined by a number of communication channels. According to the method, arrival probabilities for various types of channel structures are estimated and used as the basis of the allocation and reallocation. Priorities are assigned to the various types of channel structures, and a priority list is disclosed which can be consulted to perform the allocation and reallocation. Preferably, an allocation and a reallocation are performed for each arrival of a channel structure to the resource area, and a reallocation is performed after each departure of a channel structure from the resource area.

38 Claims, 5 Drawing Sheets

| CHANNEL STRUCTURE | a) | b) | c) | d) | e) | f) |
|---|---|---|---|---|---|---|
| ARRIVING PROBABILITY | 0.5 | 0.2 | 0.1 | 0.05 | 0.1 | 0.05 |
| CAN INCLUDE | NONE | a) | a), b) | a), b), c), e) | a) | a), e) |
| TOTAL ARRIVAL PROB: | 0.5 | 0.7 | 0.8 | 0.85 | 0.6 | 0.65 |
| PRIORITY (HIGHEST=1) | 6 | 3 | 2 | 1 | 5 | 4 |

| CHANNEL STRUCTURE | a) | b) | c) | d) | e) | f) |
|---|---|---|---|---|---|---|
| ARRIVING PROBABILITY | 0.5 | 0.2 | 0.1 | 0.05 | 0.1 | 0.05 |
| CAN INCLUDE | NONE | a) | a), b) | a), b), c), e) | a) | a), e) |
| TOTAL ARRIVAL PROB: | 0.5 | 0.7 | 0.8 | 0.85 | 0.6 | 0.65 |
| PRIORITY (HIGHEST=1) | 6 | 3 | 2 | 1 | 5 | 4 |

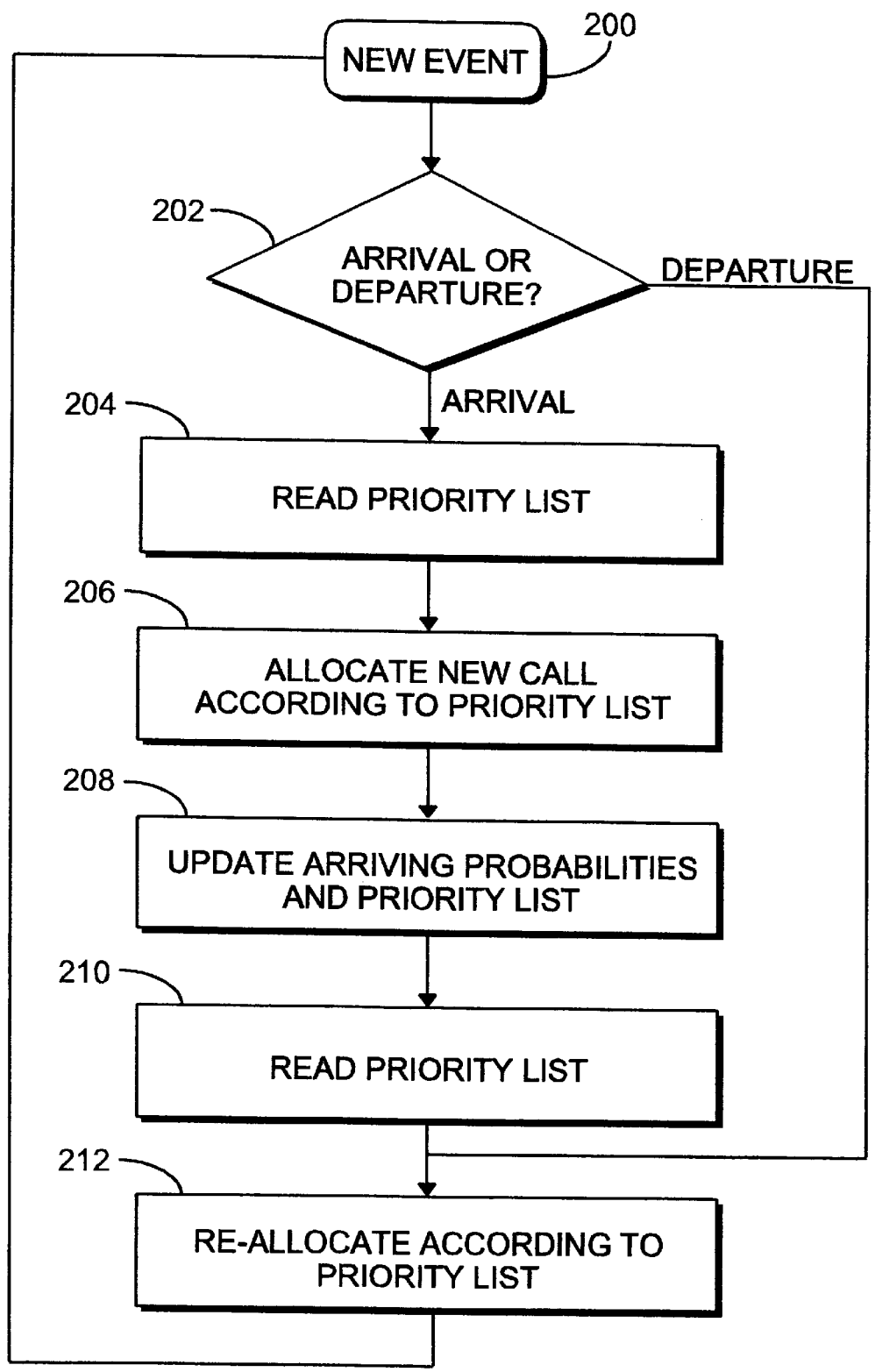

CHANNEL ALLOCATION FOR MIXED MULTISLOT SERVICES

FIELD OF THE INVENTION

The present invention relates generally to the allocation of channel resources in a communication system. More particularly, the present invention relates to a method and system for allocating channel resources to users desiring or requiring multislot and/or multicarrier resources.

BACKGROUND OF THE INVENTION

In a typical TDMA communication system, most telecommunication services have substantially the same channel structure, i.e., a single time slot on a single carrier. Thus, channel allocation is relatively straightforward.

However, the introduction of more powerful and complex services requires the allocation of different numbers of time slots and carriers for different users. The particular combinations of time slots and carriers can be referred to as "channel structures". The allocation of different types of channel structures in a communication system is significantly more complicated than the case where the channel structures of all users are identical. Appropriate channel allocation methods are desirable to efficiently allocate resources without blocking.

U.S. Pat. No. 5,542,093 discloses a method for redistributing dual mode mobile units to extended channel groups to reduce congestion in primary channel groups. If there is a shortage of channels for single mode mobiles, the system allocates a new call to a channel type which is in lesser demand if the new call is for a multi-mode mobile, or the system hands off multi-mode mobile stations from a first group of channels to a second group of channels or vice versa to create free channels.

However, the prior art does not describe efficient methods for allocating resources to communication system users which request services requiring different numbers of slots and carriers within the same group of channels.

In a typical wireless communication, some number of frequencies are allocated to an operator to be divided over the operator's coverage area. These frequencies could be further divided into timeslots or spread spectrum codes or both. In the case where the frequencies are further divided into timeslots, the channels can be said to form a "resource area". It can be difficult to allocate users to these channel resources efficiently if different users require different channel structures; i.e., different combinations of adjacent channel portions (e.g., frequencies and/or timeslots).

For example, in a case where six services with different channel structures are to use the same resource area which includes frequencies $f_0$–$f_5$ and the time slots $ts0$–$ts7$, simple random allocation can result in a situation as shown in FIG. 1. There are many empty areas (which designate potentially available resources) but very few where more of the defined structures could be accommodated. It is quite clear that this is not a spectrum efficient strategy.

Therefore, it would be desirable to efficiently allocate channel resources from a resource area for different users requiring different channel structures.

SUMMARY OF THE INVENTION

The present invention solves the above-described problems, and achieves additional advantages, by providing for a method and system for making communication channel resources available in order to accommodate later-arriving channel structures by allocating and re-allocating resources according to deterministic rules. The communication system performs an allocation for each arriving call, and a re-allocation after each arriving and departing call. The prioritization, or determination of which channel structures that are most important to make room for, is based on an estimated arrival probability for each of the different channel structures.

BRIEF DESCRIPTION OF THE DRAWINGS

The features and advantages of the present invention can be more fully understood by reading the following Detailed Description of the Preferred Embodiments in conjunction with the accompanying drawings, in which:

FIG. 2 is a flow chart of an exemplary channel allocation method according to the principles of the present invention;

DETAILED DESCRIPTION OF THE PREFERRED EMBODIMENTS

Figure 1:
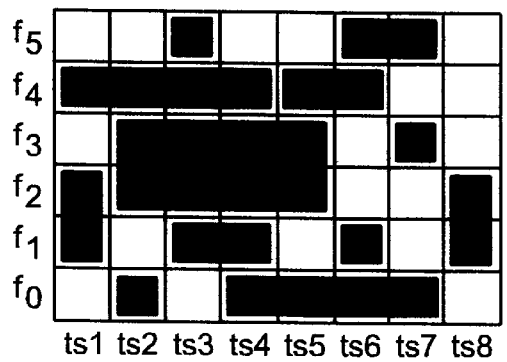
FIG. 1 is a diagram showing an exemplary result of conventional random allocation of communication services including different types of channel structures.

FIG. 2 shows an exemplary algorithm for allocating channel resources according to the principles of the present invention. The process of FIG. 2 is preferably implemented in suitable processing circuitry located, e.g., in a base station or satellite of a wireless communication system. The process begins in step 200, in which a new event is detected by the processing circuitry of the base station. In step 202, it is determined whether the new event is an arrival (e.g., a new call or channel structure request) or a departure (e.g., a call or service termination or handoff). If the new event is an arrival, a priority list (to be described later in more detail) is consulted in step 204. In step 206, the base station processing circuitry allocates resources (portions of the resource area) for the arriving call or service based on the information contained in the priority list. An exemplary allocation method will be described in detail below. In step 208, the processing circuitry updates information including, for example, probabilities of arriving channel structures and the priority list. The process then proceeds to step 210.

As is shown in FIG. 2, if the new event detected in step 200 is determined to be a departure in step 202, the process will proceed directly from step 202 to step 210.

In step 210, the priority list is consulted, and in step 212, a reallocation of resources is performed based on the information contained in the priority list. The process then returns to step 200 to await the occurrence of the next new event. It can be seen from FIG. 2 that for every arrival, both an allocation and a reallocation are performed, and for every departure, a reallocation only is performed. Preferably, such an algorithm is performed on a cell-by-cell basis; that is, each cell preferably has its own algorithm and priority list.

It should be noted that a re-allocation can be considered to be an intra-cell handover (i.e., a handover from one channel position to another within the same cell). Further, an inter-cell handover can be viewed as a departure (i.e., a user departs one cell and arrives in another cell with a different priority ranking of channel structures). It should also be noted that if parameters other than arrival probabilities are used to determine priority, an update of the priority list may be necessary after reallocation. For example, if priorities are based at least in part on an expected remaining time, then the actual time of departure can affect the priority list.

Although the embodiments disclosed herein describe channel structures based on combinations of timeslots and carrier frequencies in a TDMA/FDMA hybrid communication system (commonly referred to as simply a TDMA communication system) it should be noted that the present invention can be implemented in other types of communication systems. For example, a system employing channel structures based on a combination of codes and timeslots in a spread spectrum/time division hybrid communication system could also be considered. The principles of the present invention, although explained with respect to two dimensions for the channel resources described as an area, i.e., time and frequency, could also be applied for communication systems employing more than two dimensions, e.g. time, frequency and code, in which case the channel resources can be described as a volume rather than an area.

Figure 3:
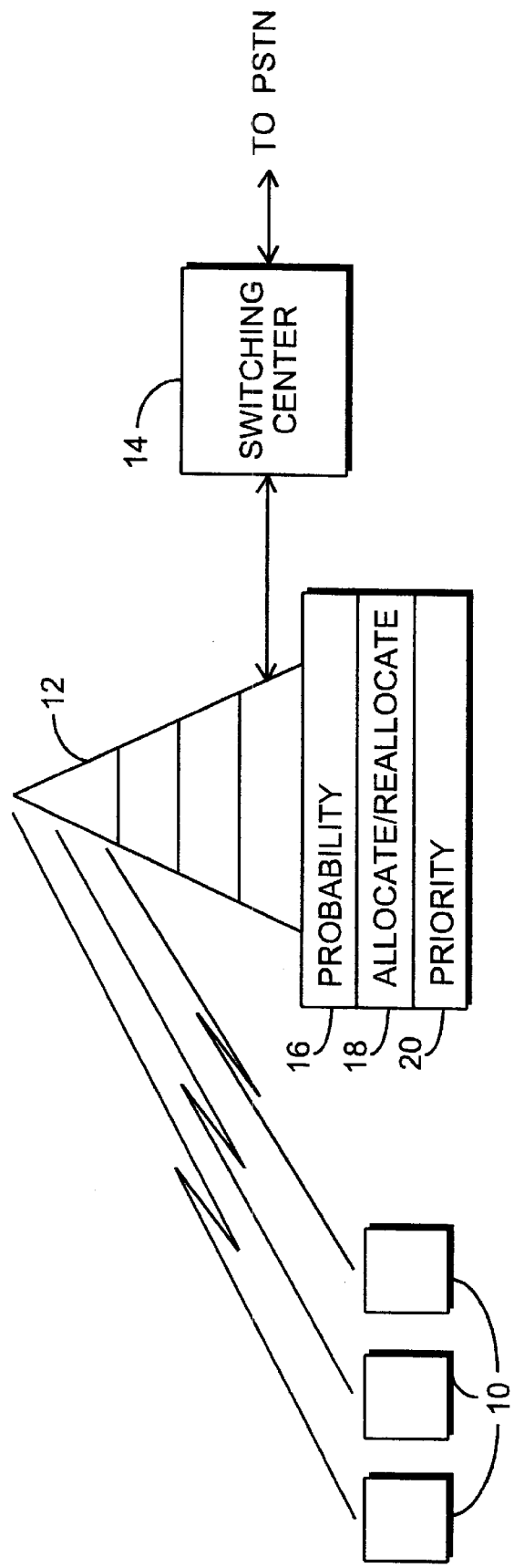
FIG. 3 is a diagram of an exemplary communication system according to an embodiment of the present invention.

Referring now to FIG. 3, an exemplary communication system according to the present invention is shown. The system includes a plurality of communication devices 10, One or more control stations (e.g., base stations or satellites) 12, and one or more switching centers 14. Preferably, each control station 12 includes processing resources which include a probability means 16 for providing an estimated arrival probability for each of the expected channel structures, and an allocation/reallocation means 18 for allowing and/or reallocating communication channel resources in the manner described herein. The system can also include priority means 20 for establishing channel structure priorities based on, for example, arrival probabilities.

Figure 4:
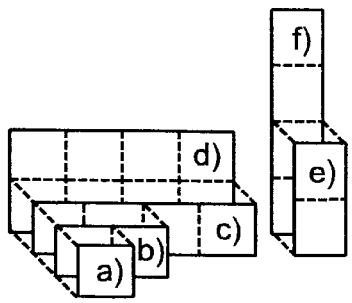
FIG. 4 is a diagram of several exemplary channel structures and a corresponding priority list for purposes of explaining the present invention.

Referring now to FIG. 4, an exemplary priority list and channel structure prioritization scheme is shown. Each channel structure type shown represents some combination of adjacent channel portions of the available communication channels necessary to provide a desired communication service. The priority list is a sorted list of all existing channel structures. The allocation and re-allocation schemes disclosed herein preferably consult the list to determine which channel structures to make room for. According to one embodiment of the present invention, individual users or mobile units may be able to select between different channel structures. For example, a mobile unit may switch between different channel structures depending upon the signal quality of the communication channel. If a user utilizing channel structure "a" requests a different channel structure "b" in the same cell (e.g., to account for additional coding and/or redundancy to overcome poor signal quality of the communication channel), then this can be considered as a departure of channel structure "a" and an arrival of channel structure "b", even though no new users have arrived.

The priority list is preferably designed according to the following rules. First, the arrival probability for each channel structure is estimated, and the structure with highest arrival probability is assigned the highest priority, the structure with the next highest arrival probability is assigned the next-highest priority, and so on until all expected channel structures are assigned a priority. Second, a channel structure that can include other, smaller, channel structures can be prioritized by adding the arrival probabilities of the smaller structures to its own arrival probability. Probability estimation can be performed in many different ways. For example, the statistical history of arriving structures can be analyzed with respect to time of day, weekdays, months, etc. Alternatively, probability can simply be assigned.

The priority list could also be designed by taking into consideration parameters other than estimated arrival probability. For example, a channel structure could be assigned a higher priority because it can accommodate a certain service which is considered especially important. Another parameter in the calculation of a priority measure could be a measure of "expected remaining time" for the users already connected to the system. This measure could provide an estimate on what types of channels that will become available next, and, e.g., make reallocation unnecessary on certain occasions.

In the example shown in FIG. 4, since structure "c" can include structures "a" and "b", its total arrival probability is determined by adding the probabilities for structures "a" (0.5) and "b" (0.2) to the probability for structure "c" (0.1). Thus, the total arrival probability for structure "c" is 0.8, and its priority in this example is 2 (second highest priority).

Figure 5:
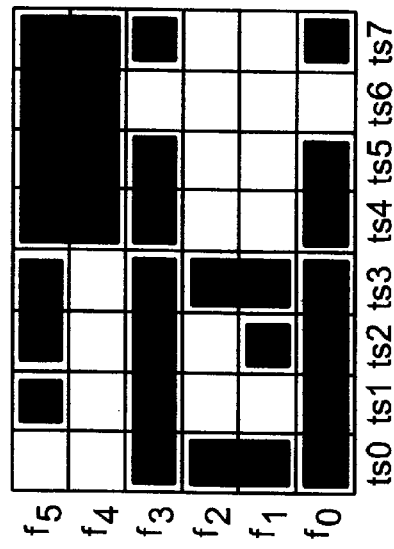
FIG. 5 is a diagram of an exemplary resource area for purposes of explaining the present invention.

An exemplary resource allocation (such as might be performed in step 206 of FIG. 2) will now be described. FIG. 5 shows an example of a resource area using the allocation method of the present invention. Resource areas in use (i.e., channel structures) are shown in black, and available resources are shown as empty spaces. According to the invention, every empty area in the resource area will be associated with the channel structure(s) for which there is room. In each empty area, there can thus be one or several "empty area structures" that correspond to the different possible channel structures. This is illustrated in FIG. 5.

In the example of FIG. 5, empty area structures have been created where the possible channel structures shown in FIG. 4 can fit. The empty area ($f_1$:$f_2$,ts1) contains empty area structures of type "a" and "e" (see FIG. 3). ($f_2$,ts1) is also part of an empty area structure of type "b".

When a new channel structure arrives, a corresponding empty area structure in the resource area is surrendered. The empty area structure is preferably chosen as follows. Among the empty area structures that: first, have room for the arriving channel structure, and second, are not the only empty area structure of its kind, the empty area structure with lowest priority is chosen. The second criterion provides for as many different structures as possible for as long as possible. The allocation is preferably performed with respect to not only the priority value associated with the arriving channel structure, but also with respect to the priority value of other channel structures.

An exemplary resource allocation (without reallocation) is shown in FIGS. 6a–d. For purposes of explanation, the possible channel structures and priorities are assumed to be the same as in FIG. 4.

Figure 6A:
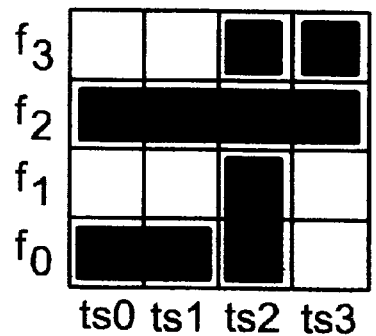
FIGS. 6a–d are resource area diagrams showing an exemplary allocation of channel resources according to the present invention.

In FIG. 6(a) three different empty area structures are available, two of which are of type "b" and one of which is of type "e". All can include "a"-type structures as well.

Figure 6B:
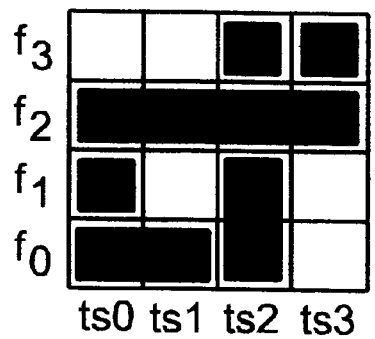

In FIG. 6(b), an "a"-type channel structure arrives. Since there are two "b"-type empty areas and only one "e"-type empty area, one of the "b"-type areas ($f_1$,ts0) is given up and a part of it is allocated to service the incoming call structure. This is true even though "b" has higher priority than "e".

Figure 6C:
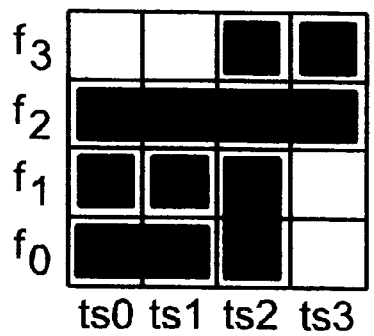

In FIG. 6(c), another "a"-type channel structure arrives. There are one "a"-type, one "b"-type and one "e"-type empty area structures. Since the "a"-type structure ($f_1$,ts1) has lowest priority, it is sacrificed and allocated to service the incoming call structure.

Figure 6D:
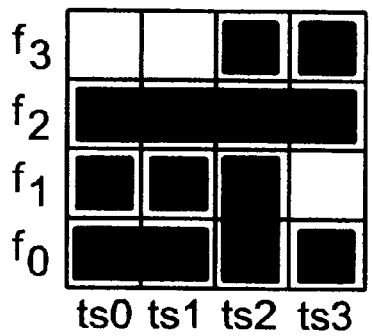

In FIG. 6(d), again an "a"-type structure arrives. Now the "e"-type empty area ($f_0$,ts3) has the lowest priority and is thus given up and part of it is allocated.

An exemplary resource re-allocation, such as might be performed in step 212 (FIG. 2), will now be described. Empty areas can be reshaped by re-allocations to enhance the efficiency of the resource area. The re-allocations can be performed, for example, whenever an allocation has been performed and after a call departure. An exemplary re-allocation can be divided into two steps. For example, it can first be determined whether all possible arriving channel structures can fit in the existing empty areas, beginning with the highest priority. When an empty area cannot be found for an arriving channel structure, it is attempted to create a new empty area for that structure, while sacrificing only empty area structure(s) of lower priority. Then, if all possible structure are already provided for, it can be determined whether it is possible to make room for additional arrivals of a certain structure, beginning with the one with highest priority. This is preferably done while sacrificing only empty area structures of lower priority, and without sacrificing the last of any other empty area structure. It should be appreciated that in certain situations, the step of reallocating will not actually result in any changes to the resource area.

FIGS. 7a–d show two exemplary resource re-allocations. Again, for purposes of explanation, it is assumed that the possible structures and priorities are the same as in FIG. 4. In this example, only one re-allocation at a time is allowed.

Figure 7A:
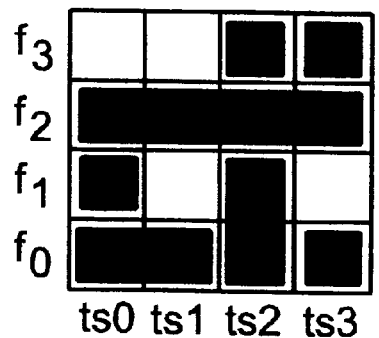
FIGS. 7a–d are resource area diagrams showing two exemplary reallocations of channel resources according to the present invention.

Between the instances depicted in FIGS. 6(d) and 7(a), the user ($f_1$,ts1) in FIG. 6(d) has departed. As a result of the departure, a reallocation is performed. It will be noted that in this example, neither a "d", nor a "c"-type area can be created by a single re-allocation. A "b"-type area already exists and an "f"-type is not possible to create. An "e"-type, however, is possible to create by re-allocating ($f_o$,ts3) in FIG. 7(a) to ($f_1$,ts1) in FIG. 7(b).

Figure 7B:
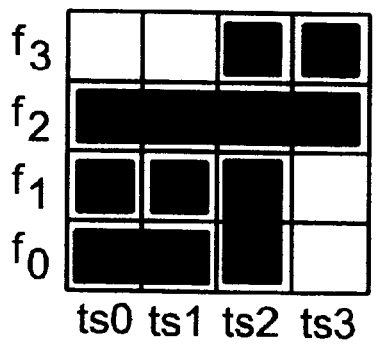
Figure 7C:
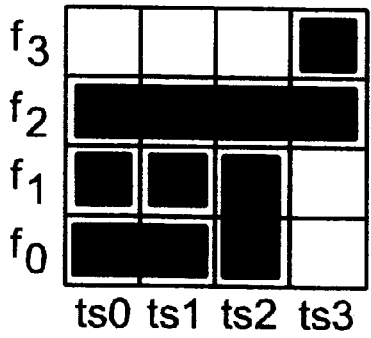
Figure 7D:
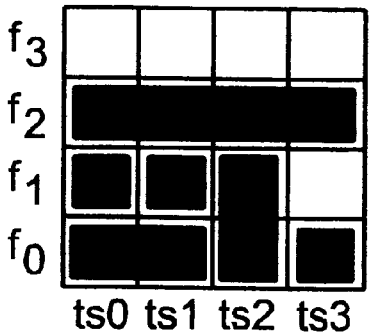

Between the instances depicted in FIGS. 7(b) and 7(c), the user ($f_3$, ts2) has departed, and, no "d"-type area can be created. However, by allocating the user ($f_3$,ts3) in FIG. 7(c) to ($f_0$, ts3) in FIG. 7(d), a new "c"-type area is gained by giving up an "e"-type area. Because "c" has higher priority than "e", this is a correct re-allocation. It will be appreciated that other possibilities may exist, particularly if multiple reallocations are allowed.

It will be appreciated from the foregoing description that the invention provides a new means for allocating channel resources efficiently in a wireless communication system supporting services which require different numbers of time slots and carriers, to significantly decrease the blocking probability.

While the foregoing description includes numerous details and specificities, it is to be understood that these are presented for purposes of illustration only. Thus, the details and specificities are not limitations of the invention; rather, many modifications will be readily apparent to those of ordinary skill in the art without departing form the spirit and scope of the invention, as defined by the following claims and their legal equivalents.

What is claimed is:

1. A method for allocating communication channel resources defined by a number of channel portions, comprising the steps of:
   estimating an arrival probability for each of a plurality of channel structures, wherein each channel structure is formed of at least one of the channel portions and wherein the plurality of channel structures can accommodate a plurality of communication services; and
   allocating communication channel resources for an arriving one of the channel structures according to the estimated arrival probabilities wherein the arrival probability for each of the plurality of channel structures represents the likelihood of arrival of said channel structure.

2. The method of claim 1, further comprising the step of assigning a priority to each of the plurality of channel structures based on at least its associated arrival probability, and wherein the step of allocating is performed according to the assigned priorities.

3. The method of claim 1, further comprising the step of reallocating communication channel resources after the step of allocating, according to the estimated arrival probabilities.

4. The method of claim 2, further comprising the step of reallocating communication channel resources after a channel structure arrives according to the assigned priorities.

5. The method of claim 1, further comprising the step of reallocating communication channel resources after one of the channel structures departs, according to the estimated arrival probabilities.

6. The method of claim 2, further comprising the step of reallocating communication channel resources after one of the channel structures departs, according to the assigned priorities.

7. The method of claim 1, wherein the step of allocating is performed such that an availability of channel resources for a first channel structure having a first estimated arrival probability is prioritized over an availability of channel resources for a second channel structure having a second estimated arrival probability which is lower than the first estimated arrival probability.

8. The method of claim 2, wherein a priority list is formed based on the assigned priorities, and wherein the step of allocating is performed by consulting the priority list.

9. The method of claim 8, further comprising the step of updating arrival probabilities and the priority list after the step of allocating.

10. The method of claim 1, further comprising the step of assigning to each combination of channel portions an indication of which channel structure types can be accommodated by the combination of channel portions.

11. The method of claim 1, wherein the channel portions are formed of a timeslot-frequency combination in a TDMA communication system.

12. The method of claim 1, wherein the channel portions are formed of a timeslot-spreading code combination in a TDMA/CDMA hybrid communication system.

13. The method of claim 1, wherein the channel portions are formed of a frequency-spreading code combination in a FDMA/CDMA hybrid communication system.

14. The method of claim 1, wherein the channel portions are formed of a timeslot-frequency-spreading code combination in a TDMA/FDMA/CDMA hybrid communication system.

15. The method of claim 1, further comprising the step of selecting, at a communication device, between different types of channel structures.

16. The method of claim 15, wherein the step of selecting is based on a signal quality of the communication channels.

17. The method of claim 1, wherein the step of allocating is performed by selecting an accommodation area for the arriving one of the channel structures, the accommodation area being capable of accommodating the arriving one of the channel structures, being not the only one of its kind available, and corresponding to the lowest priority.

18. A method for reallocating communication channel resources in a resource area defined a plurality of channel portions, comprising the steps of:
 estimating an arrival probability for each of a plurality of channel structures, wherein each channel structure is formed of at least one of the channel portions, and wherein the plurality of channel structures can accommodate a plurality of communication services; and
 reallocating communication channel resources based on the arrival probabilities of the channel structures wherein the arrival probability for each of the plurality of channel structures represents the likelihood of arrival of said channel structure.

19. The method of claim 18, further comprising the step of assigning a priority to each of the plurality of channel structures based on at least its associated arrival probability, and wherein the step of reallocating is performed according to the assigned priorities of the channel structures.

20. The method of claim 19, wherein the step of reallocating is performed by sacrificing accommodation areas for lower priority channel structures to increase accommodation areas for higher priority channel structures.

21. The method of claim 18, wherein the step of reallocating is performed after each allocation of communication channel resources for arriving channel structures, and after each departure of a channel structure.

22. The method of claim 19, wherein a priority list is formed based on the assigned priorities, and wherein the step of reallocating is performed by consulting the priority list.

23. The method of claim 11, further comprising the step of assigning to each combination of channel portions an indication of which channel structure types can be accommodated by the combination of channel portions.

24. The method of claim 18, wherein the channel portions are formed of a timeslot-frequency combination in a TDMA communication system.

25. The method of claim 18, wherein the channel portions are formed of a timeslot-spreading code combination in a TDMA/CDMA hybrid communication system.

26. The method of claim 18, wherein the channel portions are formed of a frequency-spreading code combination in a FDMA/CDMA hybrid communication system.

27. The method of claim 18, wherein the channel portions are formed of a timeslot-frequency-spreading code combination in a TDMA/FDMA/CDMA hybrid communication system.

28. The method of claim 18, further comprising the step of selecting, at a communication device, between different types of channel structures.

29. The method of claim 28, wherein the step of selecting is performed based on a signal quality of the communication channels.

30. The method of claim 19, wherein the priority of at least some of the plurality of channel structures is also based on a service type associated with the at least some channel structures.

31. The method of claim 19, wherein the priority is assigned also based on an expected remaining time for each channel structure.

32. The method of claim 2, wherein the priority assigned to each of the plurality of channel structures is also based on a service type associated with each channel structure.

33. The method of claim 2, wherein the priority is assigned also based on an expected remaining time for each channel structure.

34. The method of claim 31, further comprising the step of updating arrival probabilities after the step of reallocating.

35. A communication system which allows communication over communication channel resources defined by a number of channel portions, comprising:
 probability means for providing an estimated arrival probability for each of a plurality of channel structures, each channel structure being formed of at least one of the channel portions, and the plurality of channel structures accommodating a plurality of communication services; and
 allocation means for allocating communication channel resources for an arriving one of the channel structures according to the estimated arrival probabilities wherein the arrival probability for each of the plurality of channel structures represents the likelihood of arrival of said channel structure.

36. The system of claim 35, further comprising priority means for establishing a priority for each of the plurality of channel structures based on at least its associated arrival probability, and wherein the allocation means performs allocating based on the established priorities.

37. The system of claim 35, wherein the allocation means reallocates the communication channel resources after allocating, according to the estimated arrival probabilities.

38. The system of claim 35, wherein the allocation means functions such that an availability of channel resources for a first channel structure having a first estimated arrival probability is prioritized higher than an availability of channel resources for a second channel structure having a second estimated arrival probability which is lower than the first estimated arrival probability.

* * * * *